(12) United States Patent
Mayfield et al.

(10) Patent No.: US 7,016,646 B2
(45) Date of Patent: *Mar. 21, 2006

(54) COMMUNICATION SYSTEM EMPLOYING REUSE OF SATELLITE SPECTRUM FOR TERRESTRIAL COMMUNICATION

(75) Inventors: William W. Mayfield, Torrance, CA (US); Donald C. D. Chang, Thousand Oaks, CA (US); John I. Novak, III, West Hills, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 10/623,085

(22) Filed: Jul. 18, 2003

(65) Prior Publication Data

US 2004/0018837 A1  Jan. 29, 2004

Related U.S. Application Data

(63) Continuation of application No. 09/105,622, filed on Jun. 26, 1998, now Pat. No. 6,735,437.

(51) Int. Cl.
*H04Q 7/20* (2006.01)
(52) U.S. Cl. ............... 455/12.1; 455/427; 455/447
(58) Field of Classification Search ............ 455/427, 455/12.1, 11.1, 429, 430, 13.3; 370/311, 370/318, 320, 330, 348, 433; 342/352
See application file for complete search history.

(56) References Cited

U.S. PATENT DOCUMENTS 5,444,762 A  8/1995  Frey et al.
5,483,663 A  1/1996  Tawil
5,511,233 A  4/1996  Otten
5,557,656 A  9/1996  Ray et al.
5,584,046 A  12/1996  Martinez et al.
5,734,678 A  3/1998  Paneth et al.
5,754,536 A  5/1998  Schmidt
5,761,605 A  6/1998  Tawil et al.
5,848,060 A  12/1998  Dent
5,884,166 A  3/1999  Ray et al.
5,915,217 A  6/1999  Wiedeman et al.
5,937,332 A  8/1999  Karabinis
5,991,279 A  11/1999  Haugli et al.
6,052,586 A *  4/2000  Karabinis ............... 455/427
6,108,539 A  8/2000  Ray et al.
6,169,878 B1  1/2001  Tawil et al.
6,208,636 B1  3/2001  Tawil et al.
6,208,834 B1  3/2001  Tawil et al.
6,233,456 B1  5/2001  Schiff et al.
6,408,180 B1  6/2002  McKenna et al.

FOREIGN PATENT DOCUMENTS

EP  0 678 974 A2 * 10/1995

* cited by examiner

*Primary Examiner*—Jean Gelin
(74) *Attorney, Agent, or Firm*—Georgann S. Grunebach

(57) ABSTRACT

A terrestrial communication system using satellite uplink and downlink frequencies is disclosed. A terrestrial cell site produces a signal at a satellite uplink frequency that is transmitted to a terrestrial user terminal. The terrestrial cell site receives a signal at a satellite downlink frequency that was transmitted by a terrestrial user terminal. The terrestrial cell site may include a signal nulling means in the direction of a satellite producing signals at the uplink and downlink frequencies.

8 Claims, 1 Drawing Sheet

COMMUNICATION SYSTEM EMPLOYING REUSE OF SATELLITE SPECTRUM FOR TERRESTRIAL COMMUNICATION

CROSS-REFERENCE TO RELATED APPLICATION

This application is a continuation of Ser. No. 09/105,622, filed Jun. 26, 1998 now U.S Pat. No. 6,735,437, the entire contents of which are incorporated herein by this reference.

BACKGROUND OF THE INVENTION (a) Field of the Invention

This invention relates generally to a communications system and method wherein multiple communication systems are integrated into a common allocated radio frequency spectrum. More particularly, it relates to a communications system and method that integrates a terrestrial communication system into the radio frequency spectrum allocated to a mobile satellite communication system.

(b) Description of Related Art

Terrestrial communication services such as voice cellular and Personal Communication Systems (PCS) transmit information within a narrow spectrum surrounding nominal frequencies of 900 MHZ and 2 GHz respectively. The available spectra for such terrestrial communications are scarce and expensive. To operate their businesses profitably, companies providing these terrestrial communication services must maximize the number of users on their allocated frequency spectrum. This is accomplished by first sub-dividing the allocated spectrum into numerous spectra or frequency bands, and then sub-dividing large geographic areas into numerous spatially isolated communication cells. Thus, each cell can support numerous users on its multiple frequency bands, and reuse of these frequency bands across cells permits multiple users to use the same frequency band as long as they are in spatially isolated cells.

Mobile Satellite Service (MSS) providers such as the American Mobile Satellite Corporation (AMSC) provide satellite communication services through networks of mobile satellites in geosynchronous earth orbit (GEO). Other MSS providers operate satellite networks in medium earth orbit (MEO), and low earth orbit (LEO). The Federal Communications Commission (FCC) has allocated a 34 MHZ spectrum within the L-band (at 1.5 GHz) for use in mobile satellite communications. MSS providers share this 34 MHZ spectrum globally. As with the terrestrial communication providers, MSS providers can improve their profitability by maximizing the number of users on their allocated frequency spectrum. Traditionally, this has been accomplished using specific antenna designs and locations that provide spatial or geographic isolation and then reusing frequency bands across the isolated areas.

Thus, there is a need for a system and method of integrating multiple communication systems into a common allocated radio frequency spectrum. More specifically, there is a need for a system and method that integrates a terrestrial communication system into the radio frequency spectrum allocated to a mobile satellite communication system.

SUMMARY OF THE INVENTION

In accordance with one aspect of the present invention, a terrestrial communication system comprises a terrestrial cell site that produces a signal at a satellite uplink frequency and transmits it to a terrestrial user terminal, and that receives a signal at a satellite downlink frequency that was transmitted by a terrestrial terminal unit.

In accordance with another aspect of the present invention, a terrestrial communication system comprises a terrestrial terminal unit that produces a signal at a satellite downlink frequency and transmits it to a terrestrial cell site, and that receives a signal at a satellite uplink frequency that was transmitted by a terrestrial cell site.

In accordance with yet another aspect of the present invention, a method of integrating a terrestrial communication system into a satellite communication frequency spectrum comprises the following steps: a) producing a signal at a satellite uplink frequency that is transmitted from a terrestrial cell site to a terrestrial user terminal, and b) receiving a signal at a satellite downlink frequency that was produced by said terrestrial user terminal and transmitted to a terrestrial cell site.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
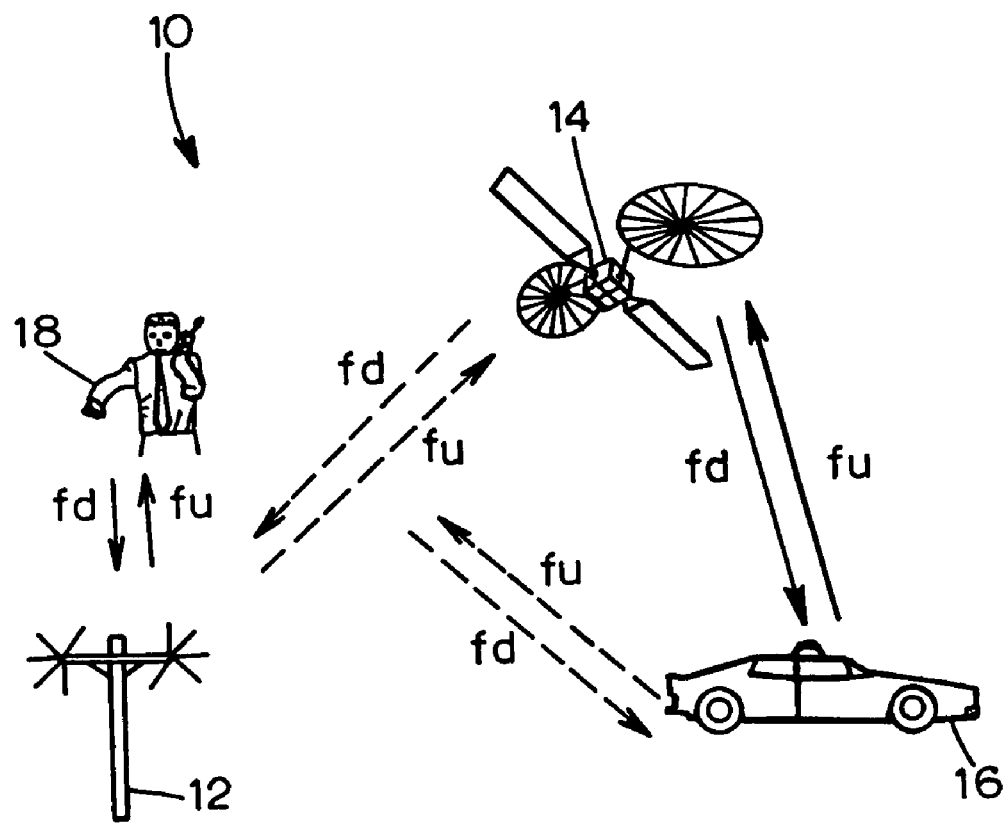
FIG. 1 is a system level diagram of a terrestrial communication system according to a preferred embodiment of the present invention.

It is highly desirable to develop a system and method for integrating a terrestrial communication system into the radio frequency spectrum allocated to a mobile satellite communication system so that MSS providers can expand their business to include millions of potential terrestrial customers. Such an expanded customer base would substantially increase an MSS provider's profitability by allowing greater utilization of their allocated spectrum.

MSS providers have been unable to integrate terrestrial communication services into their allocated frequency spectrum because conventional systems and methods of reusing frequency bands would produce intolerable levels of mutual interference. There are several difficulties inherent in integrating a terrestrial communications system into an existing satellite communication system. First, a satellite beam covers a large geographic area which could include a large number of terrestrial communication cells. Thus, a large number of terrestrial users could generate an intolerable level of aggregate interference on the satellite uplink frequency bands. Second, satellite downlink interference could impinge on a large group of terrestrial users within the scope of the satellite's beam. Third, eliminating or minimizing these interferences would require incorporation of special electronic filtering and directional antennas into a variety of hand-held terrestrial user terminals. Such design modifications are not practical because of the need for mobility, small size, and low cost in these units.

The present invention overcomes these difficulties by reversing the transmission and reception frequency bands for the terrestrial user relative to the satellite user in combination with modification of terrestrial cell site antennas to include pattern nulls in the direction of mobile satellites.

FIG. 1 shows one preferred embodiment for the present invention. The system 10 depicted in FIG. 1 reverses the transmission and reception frequency bands of the terrestrial communication system, represented by cell site 12, with respect to the satellite communication system represented by satellite 14. Terrestrial user terminals 18 transmit on the satellite system's downlink frequency ($f_d$) and receive communications on the satellite system's uplink frequency ($f_u$). This relative reversal of frequency bands shifts potential interference paths so that their impact can be more easily minimized or eliminated.

With the present invention, interference between the large number of terrestrial users and satellites has been completely eliminated. Additionally, interference between cell sites and satellite ground users has been completely eliminated.

The system shown in FIG. 1 creates four potential interference paths: (1) terrestrial cell site transmission can interfere with satellite uplinks, (2) satellite transmissions can interfere with cell site reception, (3) terrestrial user terminal transmissions can interfere with satellite ground user reception, and (4) satellite ground user transmissions can interfere with terrestrial user terminal reception. Using the disclosed system, mutual interference paths have shifted, and exist between terrestrial users 18 and ground satellite users 16, and also between cell sites 12 and satellites 14.

Mutual interference between terrestrial users 18 and satellite users 16 is easily minimized to tolerable levels through geographic isolation of frequency reuse. MSS providers are typically allocated multiple uplink and multiple downlink frequency bands. Assigning frequency bands so that terrestrial users 18 and ground satellite users 16 within the same geographic region are using different uplink and downlink bands minimizes the potential for interference within a region.

Mutual interference between cell sites 12 and satellites 14 is reduced to tolerable levels by adding pattern nulls to terrestrial cell site antennas. Adding pattern nulls to cell site antennas that block satellite interference will not ordinarily impair the quality of terrestrial communications because the desired radiation pattern for cell sites is predominantly horizontal. Furthermore, the additional cost of these cell site pattern nulls will not be prohibitive since there are relatively few cell site installations for a large number of terrestrial users.

Terrestrial user cell site antennas can be designed with high gain in the horizontal directions and with fixed nulls towards satellite directions. For example, simple sidelobe canceling techniques result in a 10 dB to 20 dB gain in the desired direction for terrestrial communications, and a −35 dB to −55 dB attenuation in the mobile satellite directions. More complex nulling techniques may be used to further improve the discrimination of the cell site antennas. For example, low gain elements may be added to the main antenna elements. Each low gain element would provide an independent null in an interference direction, and their amplitudes and phases can be adjusted so that they add destructively.

Low gain elements tend to produce narrow band nulls in a given direction. Wide band nulls can be formed to cover both the transmit and receive frequency bands (about 1 GHz separation) by using multiple low gain elements for each interference direction, or by using multiple taps on a single low gain element to produce nulls at multiple frequencies. Cost considerations will favor a multiple tap approach for low bandwidth digital applications, and the extra element approach for high bandwidth analog applications.

Of course, it should be understood that a range of changes and modifications can be made to the preferred embodiment described above. For example, more complex weighting control of the signals from the various antenna elements can be used to further improve the discrimination of terrestrial cell site antennas. Nulls of −30 dB can be achieved with a control resolution of 8 bits. Finally, a dynamic adjustment of the antenna nulls would permit the application of the present invention to satellites that are not in geosynchronous orbit. Dynamic control of the null signal weighting using a table look-up can be accomplished within a simple closed loop feedback system employing a steepest descent search algorithm and a least-mean-square as the optimization criteria. Thus, MSS providers having MEO and LEO satellite networks would thereby benefit by being able to use their allocated frequency spectrum in terrestrial applications.

It is therefore intended that the foregoing detailed description be regarded as illustrative rather than limiting and that it be understood that it is the following claims, including all equivalents, which are intended to define the scope of this invention.

What is claimed is:

1. A terrestrial communication system using satellite uplink and downlink frequencies used by satellites, comprising:

at least one terrestrial user terminal transmitting, without using said satellites, a first signal on at least one satellite downlink frequency and receiving, without using said satellites, a second signal on at least one satellite uplink frequency, wherein the first signal frequency is different than the second signal frequency.

2. The terrestrial communication system of claim 1, wherein said terrestrial communication system includes a signal nulling means in the direction of said satellites that produces signals using said uplink and said downlink frequencies.

3. A terrestrial communication system using satellite uplink and downlink frequencies used by satellites, comprising:

a terrestrial terminal unit producing a first signal at a satellite downlink frequency that is transmitted without using said satellites within the terrestrial communication system, and said terrestrial terminal unit receiving a second signal at a satellite uplink frequency different than the satellite downlink frequency that was transmitted without using said satellites from within the terrestrial communication system.

4. The terrestrial communication system of claim 3, wherein a satellite ground user using said uplink and said downlink frequencies is geographically isolated from said terrestrial terminal unit.

5. A method of minimizing interference between terrestrial user communications and satellite user communications, comprising:

reversing the transmission frequency band and reception frequency band for the terrestrial user relative to the satellite user, wherein the reception frequency bands are different than the transmission frequency band.

6. The method of claim 5, further comprising generating at least one pattern null with an antenna to reduce satellite interference.

7. A method of reusing satellite spectrum for terrestrial communications, comprising:

assigning satellite frequency bands so that terrestrial users and satellite users on the ground within the same geographic region are using different satellite uplink and downlink bands; and adding pattern nulls to terrestrial antennas, that transmit and receive signals from terrestrial users, to block satellite interference.

8. The method of claim 7 wherein the step of assigning comprises assigning transmission and reception bands to terrestrial users, wherein the transmission and reception bands are satellite downlink and uplink.

* * * * *